United States Patent [19]

Josefsson

[11] 4,214,698

[45] Jul. 29, 1980

[54] ARRANGEMENT FOR CONTROL OF THE TEMPERATURE OF HEAT RADIATORS IN A CO-TUBE SYSTEM

[75] Inventor: Hans E. Josefsson, Trangsund, Sweden

[73] Assignee: Tour & Andersson Aktiebolag, Johanneshov, Sweden

[21] Appl. No.: 962,336

[22] Filed: Nov. 20, 1978

[30] Foreign Application Priority Data

Nov. 21, 1977 [SE] Sweden ................................ 7713106

[51] Int. Cl.³ ............................................. G05D 23/12
[52] U.S. Cl. ...................................... 236/42; 137/183; 137/599; 236/99 R
[58] Field of Search .......................... 236/42, 43, 99 R; 237/67, 9 R; 137/183, 599

[56] References Cited

U.S. PATENT DOCUMENTS

| 2,028,173 | 1/1936 | Thomas | 237/67 |
| 2,087,690 | 7/1937 | Kohut | 137/599 X |
| 2,274,436 | 2/1942 | Spence | 137/599 X |
| 3,917,164 | 11/1975 | Motoyama | 236/42 |

Primary Examiner—Albert J. Makay
Assistant Examiner—William E. Tapolcai, Jr.
Attorney, Agent, or Firm—Larson, Taylor and Hinds

[57] ABSTRACT

A heat control system for a discontinuously operated heat radiator of the co-tube type is disclosed. A thermostat located away from the radiator controls the opening and closing means of an inlet steam valve located between the steam feeder connection and the radiator. A condensed water outlet valve also located between the steam feeder connection and the radiator is normally biased closed by its own weight. When the inlet steam valve is open the steam pressure on each side of the outlet valve is equal and the outlet valve remains closed as the steam entering the radiator is condensed and backs up behind it. However, when the inlet steam valve is closed, the steam pressure in the radiator is eliminated so that the steam pressure in the steam feeder connection acts on the outlet valve to push it open and allow the condensed water to drain from the radiator into the steam feeder connection.

6 Claims, 1 Drawing Figure

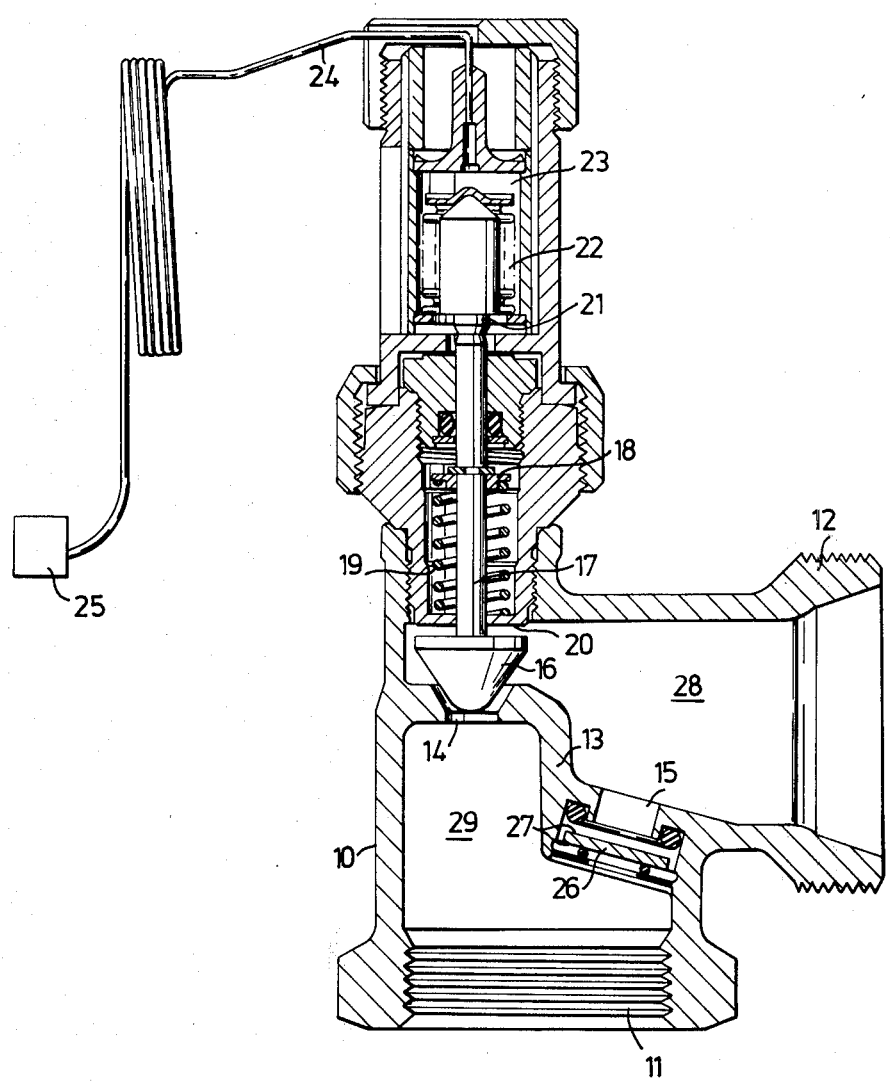

ARRANGEMENT FOR CONTROL OF THE TEMPERATURE OF HEAT RADIATORS IN A CO-TUBE SYSTEM

The present invention regards an arrangement for individual control of the temperature of heat radiators in a co-tube system. With the conception "co-tube system", thereby, is understood such heat radiator systems in which steam is fed to each separate heat radiator, is condensed within said heat radiator, and the condensed water is thereafter fed back to the same tube through which the steam was fed. The condensed water, thereby, moves downwardly along the inner side of the tube, leaving a channel free in the centre of the tube, through which the steam rises upwardly.

However, there is also another type of steam fed heat radiator systems known, in which the steam is fed through one first tube, and the condensed water is removed through a second tube. Such systems, below, will be called "to and fro tube systems".

The existing or expected energy crisis has made it strongly desirous to save burning material in heat radiator systems, and this will apply both to systems, which are fed with hot water and to systems which are fed with steam. One step in the direction of such a saving of burning material has been, no longer to allow all of the heat radiators existing within a dwelling such as a flat or a villa to be controlled in common from a thermostat, applied somewere inside of the dwelling, but to provide each separate heat radiator valve with an individual thermostat. In this way one will avoid that perhaps too much heat is fed to a plurality of room in the dwelling simply because accidentally the control thermostat happened to be situated in a room, in which there was a rather low temperature.

One could, without any greater difficulty, overcome the problems, connected therewith in hot water fed two tube systems, and also, even at a little more difficulties in water fed one tube systems. However, one has up to this time not succeeded well in the attempts as far as regards steam fed systems. The reason of this is the following one:

In steam fed to and fro tube systems, the water steam is fed through the to tube and is condensed inside of the heat radiator and removed through the fro conduit. The driving force for this circulation consisted in the water pressure created by the water column in the interior of the heat radiator, which caused a hydro-static circulation force. Little by little, when the condensed water left the heat radiator through the return conduit further steam was fed through the feeder conduit and was condensed. A given control, thereby, automatically was created by the condensation taking place at a lower speed at higher room temperature, and as a consequence thereof the heat radiator will contain a greater amount of steam and less water, and then the hydrostatic pressure will also be lower. To the contrary applies that lower room temperatures cause an increased condensation a rising level in the interior of the heat radiator and a stronger hydrostatic pressure. If now an individual control shall be used for such a heat radiator, then one will necessarily have to superimpose this control on the said automatic control. However, there is no method known for influencing the water level in the heat radiator in order of such an additional control, but one has had, for this purpose, to use valves, which were inserted either in the feeder conduit in order of letting through a greater or smaller quantity of steam, or in the return conduit in order of letting through a greater or smaller amount of return water.

The divergent properties of the two control methods have caused a lack of cooperation, and, as a matter of fact, one could not economically provide a careful control unless allowing for control margins of from 4° to 6° C., said value being compared with the control margin in hot water fed heat radiators of normally less than 1° C.

In steam fed co-tube systems, up to this time, the problems appeared as mainly unsolved. Tests have been made to provide a control by mounting a thermostatically controlled valve in the common tube, but they caused a control interval, which was firstly very unstable and which secondly caused values of essentially more than the above mentioned ones of between 4° and 6° C.

The present invention is based upon the understanding, that, as a rule the co-tube systems hitherto known were of the continuously/operating type, which means that steam was continuously fed to the heat radiator, and, as a consequence thereof, condensed water was also continously removed from the heat radiator. However, even if to a rather small extent, there are co-tube systems known in which the steam is fed discontinuously or in pulses, and one has also proposed the possibility of controlling the amount of steam in each such pulse as well as the tightness between the pulses in order, thereby to cause an individual control of the heat given off from such a heat radiator. The tests hitherto made, however, have had no success.

The present invention regards a control arrangement for individual control of the temperature of heat radiators in a co-tube system, working with discontinuous feed of steam, by means of which the disadvantages mentioned above are done away with.

According to the invention, the heat radiator is provided with a common valve device for feeding steam and removal of condensed water, said device comprising an inlet valve controlled by a movement creating apparatus for the steam and also a back movement valve, working as outlet valve for the condensate water. The inlet valve for steam is made in such a way that it will be controlled by the movement creating apparatus, which will, in turn, be arranged to be controlled by a thermostat applied a distance from the heat radiator, said control taking place in such a way that at an indication of a need of heat given from the thermostat, the said inlet valve will be periodically opened for feeding steam to the heat radiator and thereafter again periodically closed. The outlet valve for the condensed water is arranged normally to be closed by means of the steam pressure from the steam thus periodically let through but to be opened during intervals of time which are completely within the intervals of time, when no steam is fed to the heat radiator.

Below, the invention will be further described in connection with a form of execution shown in the attached drawing, but it is understood, that the invention shall not be limited to the shown form of execution, but that all different kinds of modifications will be possible within the scope of the invention.

The valve device shown in the drawing is included in a valve housing 10 with two connection bushings 11 and 12. The connection bushing 11 is connected to the steam carrier and condensed water conducting common tubing, whereas the connection bushing 12 is connected to the heat radiator, preferably at some place on only a small level of height above the lowermost part of the heat radiator or its bottom. Between the two connection bushings a wall 13 runs through the valve device, two valve openings 14 and 15, resp., being provided through said wall, the valve opening 14 at a somewhat higher level than the valve opening 15.

The valve opening 14 forms the feeder valve opening for steam and cooperates with a conically shaped valve body, controlled by a valve stem 17. This is provided with a flange 18 and a spring 19, said spring being clamped between the flange 18 and the bottom of a spring casing 20, so that the spring will tend to transfer the steam valve into its open position, in which the valve body 16 is elevated from its valve seat leaving a narrow slot free for movement of steam from the inlet 11 to the outlet 12, combined with the heat radiator. The valve stem 17, however, contacts at its free upper end the lower end of a bar controlled by the movement creating apparatus and placed at the lower end of a bellows 22, which, in turn, is accomodated inside of a bellows casing 23. The bellows casing 23 is tightly closed at its lower end but is at its upper end is connected to the interior of a capillary tube 24, which, in turn, is influenced by a thermostat 25 with possibility of adjustment for the temperature in the room heated by means of the heat radiator.

The valve opening 15 is made as a back movement control valve with a valve body 26, which will, in its normal position, leave a slot 27 free for movement of water from the connection bushing 12 and thus also from the heat radiator to the conduit, common for the steam and the condensed water, said conduit being connected to the bushing 11. When there exists a steam pressure in the heat radiator and consequently also in the chamber 28 inside of the valve casing, the valve body 26 in the back movement valve will be pressed into its position closing said valve and shown in the drawing, but after the steam pressure has decreased to a given extent, the valve body 26 will be pressed upwardly by the steam pressure in the chamber 29 inside of the valve casing 10 and make the slot 27 free for movement of condensed water from the heat radiator to the common conduit connected to the bushing 11.

This arrangement functions in the following way:

If there is indicated a need for heat by the thermostat 25, this will also mean that an essential participation of the steam, earlier existing in side of the heat radiator has condensed, so that there is place for further steam. The thermostat thereby influences by a change of the pressure in the capillary tube 24 the control means of the steam valve, so that the valve opening 14-16, which was hitherto fully closed, will be slightly opened. Thereby, however, the opening will only be rather narrow, because the steam will anyhow easily move through this valve opening. Practically immediately a steam pressure will be built up in the chamber 28, and this will cause the condensed water valve 15-26 to be closed, so that no condense water will be fed out into the conduit connected to the bushing 11, if such condensed water should exist at a level of this valve. Under normal circumstances, no condensed water is expected to exist in level with the said valve 15-26.

The increase of feed of steam to the heat radiator causes the steam to successively start to condense releasing its steam formation heat, which is transferred to the room controlled as to its temperature, and this temperature will increase. The rising temperature will influence the thermostat 25, so that this will in co-operation with the capillary tube influence the control means of the steam valve 14-16. The steam pressure in the chamber 28 then ceases practically immediately, and the valve for releasing condensed water 15-26 will again be opened. Most probably, during the time of the above described condensation of the steam fed during this period of time, the water level in the ratiator will have increased to such an extent, that it will now be above or at the opening of the valve 15-26 and consequently condensate will be fed out practically immediately after the shutting off of the steam valve and pass to the conduit connected to the bushing 11 and from this one preferably back to the steam generator for renewed formation of steam.

From the above, it will therefore be obvious that the two valves, viz. the steam valve 14-16 and the condensed water valve 15-26, will operate in a distinct alternating action, so that each of them will only be opened during short intervals of time, but these intervals of time will never cover each other. This causes two advantages essential to the present invention:

Firstly, movement of condensed water downwardly through the conduit connected to the connection 11 will never exist simultaneously with movement of steam upwardly through same conduit. In elder systems, especially the ones of the continuously operating type, such simultaneous movement of water in one first direction and of steam in the oposite direction existed, and this caused a plurality of disadvantages. One such disadvantage was that the movement of water could take place at an uneven time and thereby provide a variable resistance to the movement of steam, which made the thermostatic control difficult. Another such disadvantage was that the condensed water could have been cooled down somewhat below the temperature of the steam, and then it would take up heat from the rising steam, perhaps during momentary formation of steam, which caused so called water shots in the conduit, which action is extremely disturbing.

Secondly the thermostat will operate without disturbances, and this will cause that it can be brought to operate with an extremly high sensitivity for temperatures, which will in turn react upon the accuracy of the control of all of the system.

By the two steps in combination, therefore, one has succeeded to state in tests made, that one will obtain an interval of temperature control in an order of magnitude, which is completely comparable with the one in the best controlled water fed heat radiators, which are the ones, connected to a two tube system. Such a good control could never be achieved in steam fed radiators in a co-tube system, and, therefore, one will achieve by this invention a high degree means of constantly keeping the desired room temperature in the room controlled as to its temperature, so that a high feeling of comfort is achieved and accidental over-temperaturs will be avoided. This will mean an very considerable saving or energy.

I claim:

1. A heat control system for a discontinuously operated heat radiator of the co-tube type in which the steam feeder connection also acts as a return for condensed water comprising: a thermostat which is placed away from the radiator; an inlet steam valve between the steam feeder connection and the radiator; means for moving said steam valve to an open or a closed position in response to an indication from said thermostat; and a condensed water outlet valve between the steam feeder connection and the radiator, said outlet valve being of the return blocking type in which said outlet valve is normally biased closed by its own weight and the weight of any condensed water in the radiator; such that in response to an indication from said thermostat, said moving means opens said inlet steam valve allowing steam to enter the radiator from the steam feeder connection and heat a room, the condensed water in the radiator being prevented from entering the steam feeder connection by said outlet valve whereby when said inlet valve is later closed, the steam pressure in the radiator drops and the steam pressure in the steam feeder connection pushes said outlet valve open allowing the condensed water in the radiator to drain from the radiator back through the steam feeder connection.

2. A heat control system according to claim 1, in which the valve openings of the valves concerned are provided in a common separation wall through the valve casing containing both of the valves.

3. A heat control system according to claim 2, in which the steam valve is situated at a higher level than the condensed water valve.

4. A heat control system according to claim 1, in which the steam valve has a valve seat and a valve body, leaving only a narrow slot free when opened to pass steam therethrough.

5. A heat control system according to claim 4, in which the valve body is carried up by a valve stem under influence of a spring tending to open the valve, the movement means acting against the action of said spring.

6. A heat control system according to claim 1, in which the movement means is controlled by the thermostat under interaction of a pressure medium inside of a capillary tube.

* * * * *